United States Patent [19]

Priem et al.

[11] Patent Number: 5,136,524
[45] Date of Patent: Aug. 4, 1992

[54] METHOD AND APPARATUS FOR OPTIMIZING SELECTED RASTER OPERATIONS

[75] Inventors: Curtis Priem, Fremont, Calif.; Thomas Webber, Lynn, Mass.

[73] Assignee: Sun Microsystems, Inc., Mountain View, Calif.

[21] Appl. No.: 562,429

[22] Filed: Aug. 3, 1990

Related U.S. Application Data

[63] Continuation of Ser. No. 257,985, Oct. 14, 1988, abandoned.

[51] Int. Cl.⁵ .............................................. G06F 15/64
[52] U.S. Cl. .................................. 395/250; 340/747; 340/750; 340/725
[58] Field of Search ...................... 364/518, 521, 522; 340/744, 750, 706, 724, 725, 747

[56] References Cited

U.S. PATENT DOCUMENTS

| | | | |
|---|---|---|---|
| 4,554,538 | 11/1985 | Bieneman | 340/799 |
| 4,558,370 | 12/1985 | Mitchell et al. | 358/260 |
| 4,560,981 | 12/1985 | Jackson et al. | 340/747 |
| 4,649,378 | 3/1987 | Johnson et al. | 340/728 |
| 4,689,616 | 8/1987 | Goude et al. | 340/725 |
| 4,766,431 | 8/1988 | Kobayashi et al. | 340/799 |
| 4,805,119 | 2/1989 | Maeda et al. | 364/518 |
| 4,811,240 | 3/1989 | Ballou et al. | 364/518 |

FOREIGN PATENT DOCUMENTS

0240410   3/1987   European Pat. Off. .

Primary Examiner—Gary V. Harkcom
Assistant Examiner—Phu K. Nguyen
Attorney, Agent, or Firm—Blakely Sokoloff Taylor & Zafman

[57] ABSTRACT

Circuitry for performing high speed operations on certain Boolean raster operations in a workstation whose functions include the display of graphics images using multiple planes and having foreground and background colors. The circuitry includes a logic circuit for determining whether a particular Boolean raster operation is one for which the high speed operation is available. A Boolean raster operation is determined to be available for high speed operation if the outcome of the operation can be determined by reading only one operand, namely the source data. If the other operand, namely the destination data, is needed to determine the outcome if the operation, then the operation is performed normally. Otherwise, the operation may be performed by reading the source data only.

4 Claims, 3 Drawing Sheets

METHOD AND APPARATUS FOR OPTIMIZING SELECTED RASTER OPERATIONS This is a continuation of application Ser. No. 257,985 filed Oct. 14, 1988, now abandoned.

SUMMARY OF THE INVENTION

The present invention is directed to circuitry for performing high speed operations on certain Boolean raster operations in a workstation whose functions include the display of graphics images using multiple planes and having foreground and background colors. The invented circuitry includes a logic circuit for determining whether a particular Boolean raster operation is one for which the high speed operation is available. A Boolean raster operation is determined to be available for high speed operation if the outcome of the operation can be determined by reading only one operand, namely the source data. If the other operand, namely the destination data, is needed to determine the outcome if the operation, then the operation is performed normally. Otherwise, the operation may be performed by reading the source data only.

DETAILED DESCRIPTION OF THE INVENTION

The present invention is directed to an apparatus and method for use in a computer system used for the graphic display of images. Although the present invention is described with reference to specific circuits, block diagrams, signals, truth tables, bit lengths, pixel lengths, etc., it will be appreciated by one of ordinary skill in the art that such details are disclosed simply to provide a more thorough understanding of the present invention and the present invention may be practiced without these specific details. In other instances, well known circuits are shown in block diagram form in order not to obscure the present invention unnecessarily.

Figure 1:
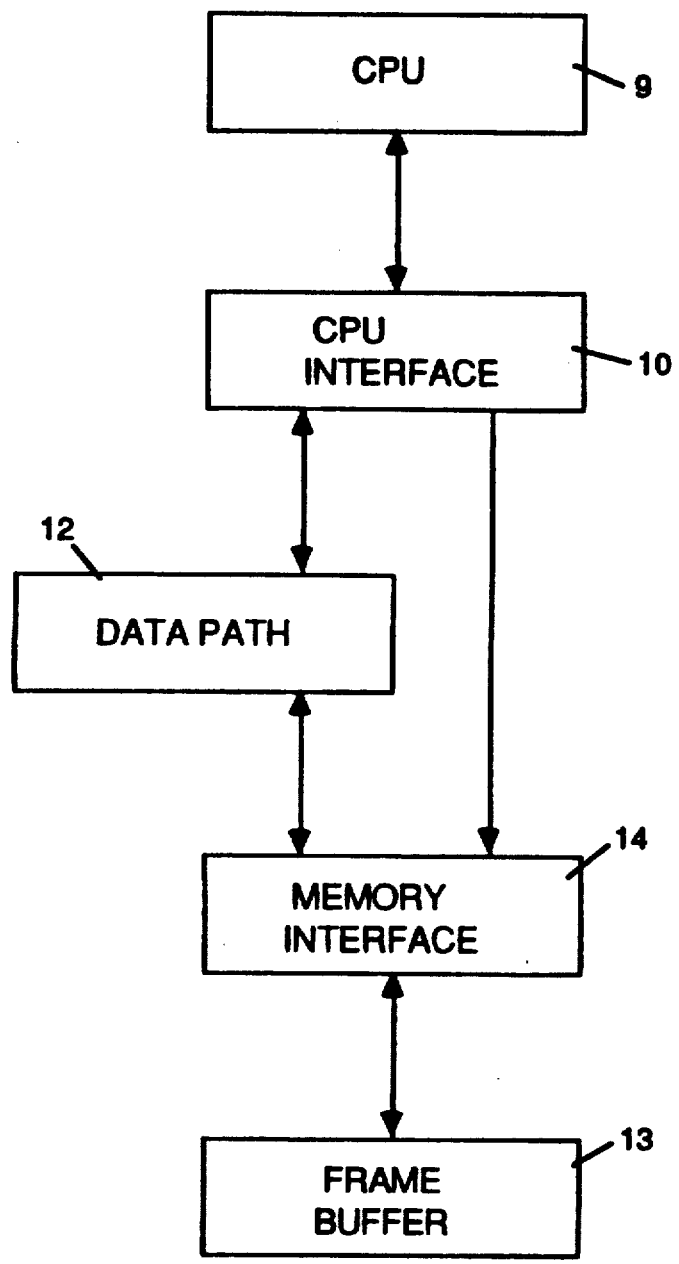
FIG. 1 is a block diagram showing the environment of the present invention.

In FIG. 1 there is shown a general block diagram of the environment of the present invention. CPU 9 is defined herein as embracing circuitry external to the other components shown in FIG. 1, and provides data, control signals and addresses through CPU interface 10 necessary for the operation of the invention herein described.

CPU 9 through CPU interface 10 also provides addresses to a memory interface 14 and data to data path circuitry 12. The data path circuitry 12 is also provided with data which is read from a display frame buffer 13 by memory interface 14. Data is outputted by data path circuitry 12 to memory interface 14 for writing therefrom to the frame buffer at an address provided by CPU 9. The present invention is directed to specific circuitry and techniques in data path 12. Details concerning CPU 9, CPU interface 10, frame buffer 13 and memory interface 14 will be apparent to those skilled in the art of computer created graphics displays and are therefore not set forth herein except as needed for a proper understanding of the invention.

Figure 2:
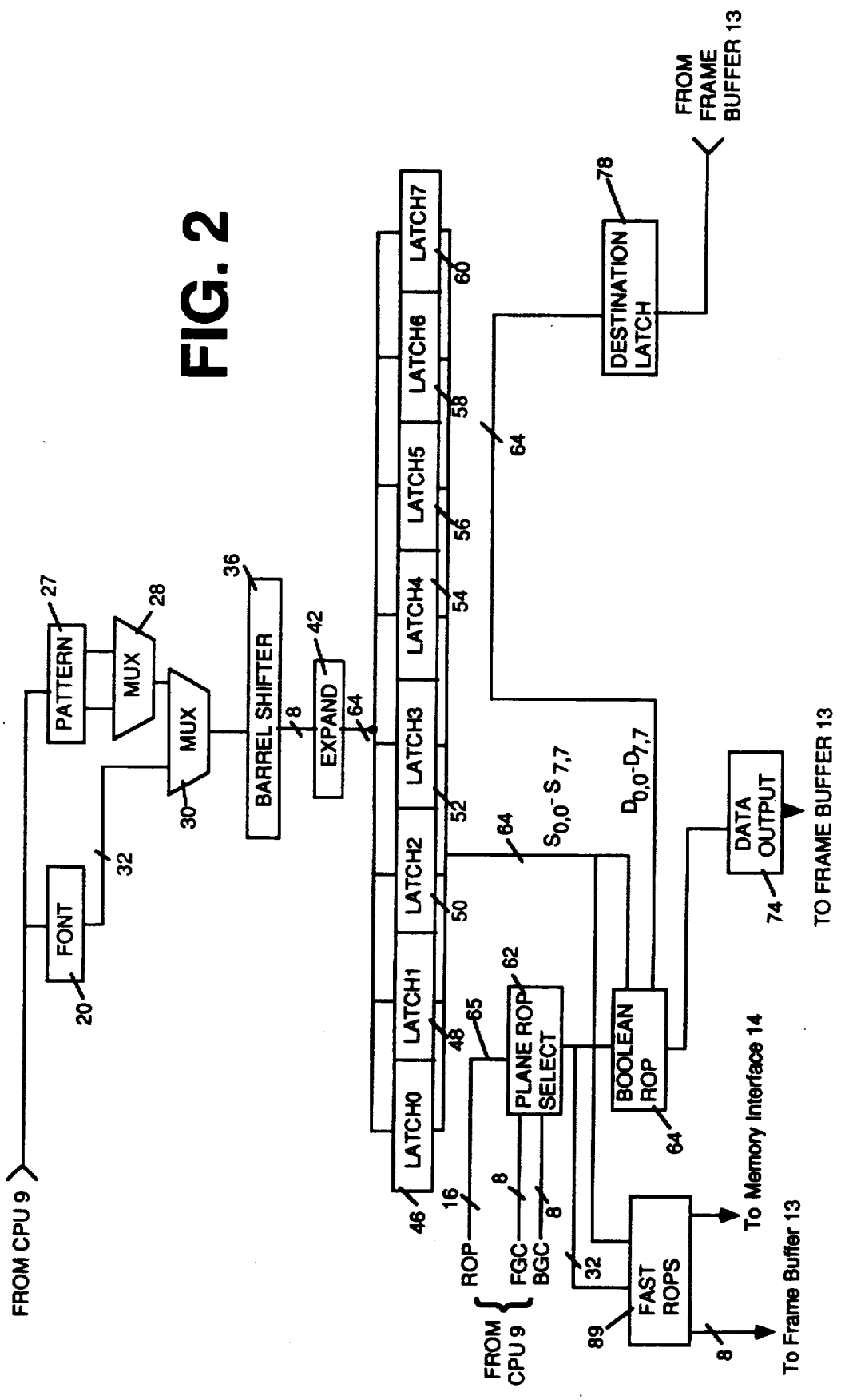
FIG. 2 is a block diagram of the data path circuitry which comprises the present invention.

Data path circuitry 12 will now be described in detail with reference to FIG. 2, which is a functional block level diagram of the data path circuitry 12 of FIG. 1. For purposes of the following explanation, the terms "destination" and "source" data will be introduced. Destination data is data which is written into the frame buffer or is the data currently residing at the address in the frame buffer about to be written. Source data is data which is provided from one of two sources, the CPU 9, which provides font source data to font register 20 and pattern register 27 which stores a predetermined pattern and provides pattern source data. The data path circuitry 2 combines source data with the destination data and produces new destination data which is written to a desired location of the frame buffer, which in turn, is ultimately displayed on a video display.

The current destination data, which is stored in destination latch 78, is read from the frame buffer at an addressed memory location of the frame buffer 13 via memory interface 14. The appropriate addresses are provided to memory interface 14 from the CPU 9. The destination data is held in latch 78 and then combined, by a Boolean operation specified by CPU 9, with one of the two sources of data supplied by font register 20 or pattern register 27 as will be described below in more detail. The combination of a source and destination data yields a new destination data which is channeled through destination data output latch 74 and written to a location within the frame buffer memory specified by an address supplied by CPU 9 to memory interface 14.

In one mode of operation, the present invention combines font source data (supplied by font register 20) with frame buffer destination data (supplied by latch 78). When a display of font data is requested by a user, CPU 9 issues a command which causes font register 20 to output its font data. This data is then selected by multiplexer 30 and inputted into barrel shifter 36.

Multiplexer 30 selects the sources of data to be input to barrel shifter 36 as between font register 20 and pattern register 27. Barrel shifter 36 moves the font data from multiplexer 30 over a predetermined amount of bits so that it lines up over, for example, a 16 pixel memory access within frame buffer 13. For example, when a ten bit wide font is written which begins at the thirteenth pixel memory location of frame buffer 13, barrel shifter 36 is instructed, by CPU 9, to shift the font data over thirteen places, so that the beginning of the font data is aligned with the thirteenth address within the frame buffer 13 in the 16-pixel portion of frame buffer memory that will be operated on. It will therefore be appreciated that barrel shifter 36 is used for alignment so that when font data is written into the frame buffer memory, the font data will align in the correct memory location as determined by the address sent thereto by CPU 9.

The shifted ovr data supplied by barrel shifter 36 is channeled into a set of eight bit latches 46, 48, 50, 52, 54, 56, 58 and 60. This set of latches store one pixel worth of data which will be written into the frame buffer (8 pixels total).

The present invention uses eight 8 bit latches so that each latch 46, 48, 50, 52, 54, 58 and 60 can store eight bits of data, and therefore contain eight planes of information (as described below with reference to FIG. 3 for each of eight pixels. The eight pixels of information will be half of a memory access since, in the preferred embodiment, a frame buffer memory space of 16 pixels (which corresponds to 16 pixels of a video display) may be updated in one memory access. The remaining eight pixels of information from the next memory access are sent to barrel shifter 36 and are distributed to latches 46, 48, 50, 52, 54, 56, 58 and 60 in the second half of the memory cycle operation in the same manner as the first. Font data is available in 1 bit per pixel mode (Font-1) for monochrome or 8 bit per pixel mode (Font-8) for color. In Font-1 mode, expand circuitry 42 replicates the 1 bit per pixel eight times. Latches 46, 48, 50, 52, 54, 56, 58 and 60 supply the font source data, eight bits at a time, to an input of Boolean raster-op circuit 64 which is described in copending application Ser. No. 258,133 filed Oct. 14, 1988, now U.S. Pat. No. 4,908,780. The frame buffer destination data held in destination latch 78 is coincidentally released and channeled to a second input of Boolean raster-op 64.

Plane raster-op select 62 which is also described in copending application Ser. No. 257,853, filed Oct. 14, 1988, now U.S. Pat. No. 4,958,146 and Boolean-raster-op circuit 64 then combine, by way of a selected Boolean operation, the frame buffer destination data from latch 78 with the font source data from latches 46, 48, 50, 52, 54, 56, 58, 60 which were originally supplied by font register 20. The possible Boolean operations which are common to graphics displays are shown in Table 1.

TABLE I

| NUMBER | OPERATION | DESCRIPTION |
|---|---|---|
| 0 | CLEAR | $d \leftarrow (0)$ |
| 1 | NOR | $d \leftarrow (\sim((d) \mid (s)))$ |
| 2 | ERASE | $d \leftarrow ((d) \& \sim(s))$ |
| 3 | DRAW INVERTED | $d \leftarrow (\sim(s))$ |
| 4 | ERASED REVERSED | $d \leftarrow ((\sim(d) \& (s))$ |
| 5 | INVERT | $d \leftarrow (\sim d))$ |
| 6 | XOR | $d \leftarrow ((d) \quad (s))$ |
| 7 | NAND | $d \leftarrow (\sim(d) \& (s))$ |
| 8 | AND | $d \leftarrow ((d) \& (s))$ |
| 9 | EQUIVALENT | $d \leftarrow (d) \quad \sim(s))$ |
| 10 | NOP | $d \leftarrow (d)$ |
| 11 | PAINT INVERTED | $d \leftarrow (d) \mid \sim(s))$ |
| 12 | DRAW | $d \leftarrow (s)$ |
| 13 | PAINT REVERSED | $d \leftarrow (\sim(d) \mid (s))$ |
| 14 | PAINT | $d \leftarrow ((d) \mid (s))$ |
| 15 | SET | $d \leftarrow (\sim 0)$ | where
$\sim$ = one's complement
| = INCLUSIVE OR
  = EXCLUSIVE OR
& = AND
d = destination data
s = source data The source and destination data are combined by plane raster-op select 62 and Boolean raster-op 64 in the following fashion. CPU 9 provides to plane raster-op select 62 four groups of four bits via data line 65. Each group of four bits encodes one of 16 possible Boolean operations. Plane raster-op select 62 is provided with, also by CPU 9, foreground color (FGC) and background color (BGC) status signals for each of eight planes. The FGC and BGC signals represent, respectively, the foreground and background colors of the image being rendered on the video display. It will be appreciated that higher bit resolutions and more than two colors may be used.

Since for each plane there are four possible combinations of the FGC and BGC signals at the input of plane raster-op select 62, one of the four groups of four bits are selected as determined by the FGC and BGC signals. The selected four bit group which identifies the desired Boolean operation is outputted to Boolean raster-op 64 which then combines the source and destination data by way of the Boolean operation specified by plane raster-op select 62.

The result of the combination of the pattern source data and the frame buffer destination data $D_{0,0}-D_{7,7}$ is supplied to latch 74 for outputting therefrom to memory interface 14 of FIG. 1. Memory interface 14 then writes the new destination data into frame buffer 13 at a memory location specified by an address supplied by the CPU 9.

Figure 3:
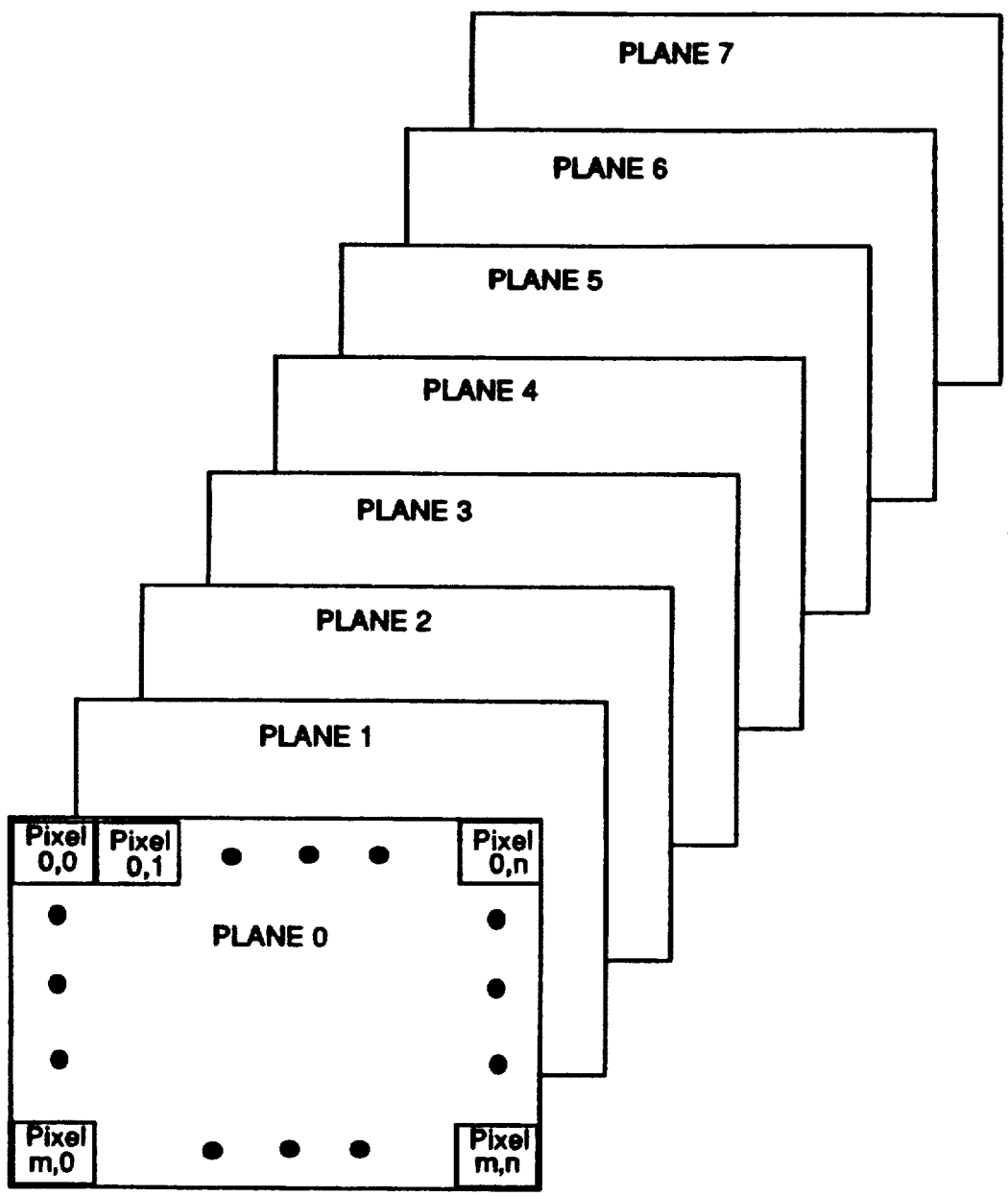
FIG. 3 is a diagramatic representation of the eight planes of information in a frame buffer.

The above combining of data is performed one plane at a time in the frame buffer memory since, in the preferred embodiment of the invention, the frame buffer memory is divided into eight planes, each plane representing the pixels on a video display as shown in FIG. 3.

Referring again to FIG. 2, for line drawing, pattern register 27 is used. Pattern register 27 is supplied with pattern source data by CPU 9. The pattern register is, in the preferred embodiment, a 16 by 16 bit matrix of binary values and is supplied with an address by the CPU 9 which selects a 16 bit row as a desired source. The 16 bit row will ultimately, when displayed, repeat logically across an entire scan line of a video display, beginning with every 16th pixel thereof. Multiplexer 28, as controlled by CPU 9, selects the 16 bit parcel of pattern data from pattern register 27, in eight bit increments. Multiplexer 30, which is also controlled by CPU 9, then selects an eight bit increment and channels it to barrel shifter 36.

Barrel shifter 36, when supplying pattern information, is passive and acts as a pipeline without shifting the data bits over a predetermined number of bits and supplies an eight bit increment of pattern data to the latches 46, 48, 50, 52, 54, 56, 58 and 60. The eight bit increment of pattern data is also replicated eight times by expand circuitry 42, such that the information is duplicated for each latch 46-60, such that each latch has 8 bits of pattern data.

The information contained in latches 46, 48, 50, 52, 54, 56, 58 and 60 are supplied, under CPU control, to Boolean raster-op circuit 64, which combines the source information supplied by pattern register 27 with destination data supplied by destination register 78 by way of a Boolean operation specified by CPU 9 as briefly described above and is described in detail in copending application Ser. No. 258,133 filed Oct. 14, 1988, now U.S. Pat. No. 4,908,780. The result of the combination of the pattern source data and the frame buffer destination data is supplied to latch 74 for outputting therefrom to memory interface 14 of FIG. 1. Memory interface 14 then writes the new destination data into frame buffer 13 at a memory location specified by an address supplied by the CPU 9.

The present invention is directed to a method and apparatus for eliminating unnecessary frame buffer read operations in the combination of data and operates under the following principle. There are sixteen commonly utilized Boolean operations used with graphics oriented video displays as specified in Table I above. For nine out of the foregoing sixteen Boolean operations, the outcome may be determined by knowing the selected operation and only the source data. Accordingly, once the source data is known, the destination data need not be read from the frame buffer in nine out of sixteen cases. Referring back to FIG. 2, fast raster-op logic 89 obtains source data from latches 46-60 and with the selected operation from plane raster-op select 62, if one of the nine possible operations from which the result can be ascertained without reading the destination data, determines whether a fast Boolean raster operation is possible. New destination data is generated by plane ROP select 62 and Boolean ROP 64 as described earlier. For the nine fast Boolean raster operation cases, fast ROP block 89 identifies to memory interface 14 for the current memory access which pixels stored in data output latch 74 have the correct value in them despite destination latch 78 not containing data related to the current access. For only those pixels identified will memory interface 14 permit the new destination data in data output latch 74 to update (or write) the frame buffer 12. For those pixels not so identified, the frame buffer will retain their current data which is the proper result given the operation specified and the source data.

Fast raster-op logic 89 contains control logic which implements the results shown in Table II, wherein there is shown the nine Boolean operations for which the result to be moved to the frame buffer can be determined by the Boolean operation and source, without reading the destination. In Table II, S is the value of a source bit, D is the value of the corresponding destination bit and D' is the result which is to be moved to the frame buffer. NO. is the number of the Boolean operation and Truth Table is the logical result of the particular Boolean operation. WRITE ENABLE "yes" sends a signal to memory interface 14 that new destination data in output latch 74 may be used to update the frame buffer. WRITE ENABLE "no" sends a signal to memory interface 14 that the frame buffer should not be updated with data in output latch 74. However, the source bits for each pixel, that is, one bit for each of the eight planes, must be all 0's or all 1's for that pixel to be eligible for a fast Boolean raster operation and the raster operation for each plane must be in the same group as determined by WRITE MASK. That is, the selected Boolean operation for each plane, in addittition to being one for which a fast Boolean raster operation is possible, must have the same WRITE MASK i.e., "0", "1", Source or Source Complemented to be eligible for a fast Boolean raster operation.

TABLE II

| NO. | OPERATION | TRUTH TABLE S | D | D' | WRITE ENABLE | WRITE MASK |
|---|---|---|---|---|---|---|
| 0 | CLEAR | 0 | 0 | 0 | yes | "1" |
|  |  | 0 | 1 | 0 | yes |  |
|  |  | 1 | 0 | 0 | yes |  |
|  |  | 1 | 1 | 0 | yes |  |
| 2 | ERASE | 0 | 0 | 0 | no | Source |
|  |  | 0 | 1 | 1 | no |  |
|  |  | 1 | 0 | 0 | yes |  |
|  |  | 1 | 1 | 0 | yes |  |
| 3 | DRAW INVERTED | 0 | 0 | 1 | yes | "1" |
|  |  | 0 | 1 | 1 | yes |  |
|  |  | 1 | 0 | 0 | yes |  |
|  |  | 1 | 1 | 0 | yes |  |
| 8 | AND | 0 | 0 | 0 | yes | Source Complemented |
|  |  | 0 | 1 | 0 | yes |  |
|  |  | 1 | 0 | 0 | no |  |
|  |  | 1 | 1 | 1 | no |  |
| 10 | NOP | 0 | 0 | 0 | no | "0" |
|  |  | 0 | 1 | 1 | no |  |
|  |  | 1 | 0 | 0 | no |  |
|  |  | 1 | 1 | 1 | no |  |
| 11 | PAINT INVERTED | 0 | 0 | 1 | yes | Source Complemented |
|  |  | 0 | 1 | 1 | yes |  |
|  |  | 1 | 0 | 0 | no |  |

TABLE II-continued

| NO. | OPERATION | TRUTH TABLE S | D | D' | WRITE ENABLE | WRITE MASK |
|---|---|---|---|---|---|---|
|  |  | 1 | 1 | 1 | no |  |
| 12 | DRAW | 0 | 0 | 0 | yes | "1" |
|  |  | 0 | 1 | 0 | yes |  |
|  |  | 1 | 0 | 1 | yes |  |
|  |  | 1 | 1 | 1 | yes |  |
| 14 | PAINT | 0 | 0 | 0 | no | Source |
|  |  | 0 | 1 | 1 | no |  |
|  |  | 1 | 0 | 1 | yes |  |
|  |  | 1 | 1 | 1 | yes |  |
| 15 | SET | 0 | 0 | 1 | yes | "1" |
|  |  | 0 | 1 | 1 | yes |  |
|  |  | 1 | 0 | 1 | yes |  |
|  |  | 1 | 1 | 1 | yes |  |

Thus, for the trivial cases of CLEAR and SET, the D' is 0 and 1 respectively. For the ERASE function, if the source is 1, the D' is 0, otherwise, the D' is D. For the function DRAW INVERTED, the D' is the source inverted. For the AND function, if the source is 0, D' is 0, otherwise, the D' is D.

For the NOP function, the D' is always D. For the PAINT INVERTED function, if the source is 0, the D' is 1, otherwise D' is D. For the DRAW function, the D' is the same as the source. For the PAINT function, if the source is 0, the D' is D, otherwise, D' is 1. If the Boolean operation is any one other than one of the foregoing nine operations, the destination is read and the indicated Boolean function is performed by Boolean raster-op circuit 64 and the result is written back to the destination by loading latch 74. The details for building an appropriate logic circuit 89 to perform the foregoing functions are well within the abilities of the skilled practitioner based upon the foregoing description and, therefore, such details will not be set forth herein.

It will also be appreciated that the above-described invention may be embodied in other specific forms without departing from the spirit or scope thereof. The foregoing description, therefore, should be viewed as illustrative and not restrictive, the scope of the invention being set forth in the following claims.

We claim:

1. An apparatus including a central processing unit for generating control signals, said apparatus for performing Boolean raster operations on source and destination data for storage in a frame buffer memory for a plurality of memory planes, said source data being selected from one of a font register and a pattern register, said destination data being selected from said frame buffer, said apparatus comprising:

a) source data select means coupled to said font register and said pattern register for selecting said source data;

b) destination data select means coupled to said frame buffer for selecting said destination data;

c) plane Boolean raster operation select means coupled to said central processing unit for selecting a Boolean raster operation to be performed for each of said plurality of memory planes;

d) Boolean raster operation circuit means coupled to said plane Boolean operation select means, said source data select means, said destination data select means and said frame buffer for performing the selected Boolean raster operation for each of said plurality of memory planes on said selected source data and said selected destination data for storage in said frame buffer;

e) logic means coupled to said source data select means and said plane Boolean raster operation select means for determining whether the selected Boolean raster operation can be performed using only said selected source data, said determination being made by determining whether said Boolean raster operation can be performed using only one of a plurality of values comprising a logic one, a logic zero, said selected source data, and said selected source data complemented, said logic one and said logic zero being generated by said logic means; and f) means coupled to said logic means and said source data select means for performing said selected Boolean raster operations using only said selected source data for those selected Boolean raster operations determined by said logic means as capable of being performed using only said selected source data.

2. The apparatus defined by claim 1 wherein said Boolean raster operations determined by said logic means as capable of being performed using only the source data are CLEAR, ERASE, DRAW INVERTED, AND, NOP, PAINT INVERTED, DRAW, PAINT and SET.

3. The apparatus defined by claim 1 wherein said Boolean raster operation performing means comprises said Boolean raster operation circuit means and said logic means.

4. The apparatus defined by claim 1 wherein said logic means comprises circuitry for implementing the following truth tables where S is the source data, D is the destination data and D' is the result of the Boolean raster operation performed using the source data, WRITE ENABLE "yes" specifies that updated destination data that may be used to update the frame buffer, WRITE ENABLE "no" specifies that the frame buffer should not be updated with updated data, and WRITE MASK specifies a predetermined group of Boolean operations:

| NO. | OPERATION | TRUTH TABLE | | | WRITE ENABLE | WRITE MASK |
|---|---|---|---|---|---|---|
| | | S | D | D' | | |
| 0 | CLEAR | 0 | 0 | 0 | yes | "1" |
| | | 0 | 1 | 0 | yes | |
| | | 1 | 0 | 0 | yes | |
| | | 1 | 1 | 0 | yes | |
| 2 | ERASE | 0 | 0 | 0 | no | Source |
| | | 0 | 1 | 1 | no | |
| | | 1 | 0 | 0 | yes | |
| | | 1 | 1 | 0 | yes | |
| 3 | DRAW INVERTED | 0 | 0 | 1 | yes | "1" |
| | | 0 | 1 | 1 | yes | |
| | | 1 | 0 | 0 | yes | |
| | | 1 | 1 | 0 | yes | |
| 8 | AND | 0 | 0 | 0 | yes | Source Complemented |
| | | 0 | 1 | 0 | yes | |
| | | 1 | 0 | 0 | no | |
| | | 1 | 1 | 1 | no | |
| 10 | NOP | 0 | 0 | 0 | no | "0" |
| | | 0 | 1 | 1 | no | |
| | | 1 | 0 | 0 | no | |
| | | 1 | 1 | 1 | no | |
| 11 | PAINT INVERTED | 0 | 0 | 1 | yes | Source Complemented |
| | | 0 | 1 | 1 | yes | |
| | | 1 | 0 | 0 | no | |
| | | 1 | 1 | 1 | no | |
| 12 | DRAW | 0 | 0 | 0 | yes | "1" |
| | | 0 | 1 | 0 | yes | |
| | | 1 | 0 | 1 | yes | |
| | | 1 | 1 | 1 | yes | |
| 14 | PAINT | 0 | 0 | 0 | no | Source |
| | | 0 | 1 | 1 | no | |
| | | 1 | 0 | 1 | yes | |
| | | 1 | 1 | 1 | yes | |
| 15 | SET | 0 | 0 | 1 | yes | "1" |
| | | 0 | 1 | 1 | yes | |
| | | 1 | 0 | 1 | yes | |
| | | 1 | 1 | 1 | yes. | |

* * * * *

UNITED STATES PATENT AND TRADEMARK OFFICE
CERTIFICATE OF CORRECTION

PATENT NO. : 5,136,524
DATED : August 4, 1992
INVENTOR(S) : Priem et al.

It is certified that error appears in the above-identified patent and that said Letters Patent is hereby corrected as shown below:

In column 2 at line 15, please delete " 2 " and insert -- 12 --.

In column 2 at line 58, please delete " ovr " and insert -- over --.

In column 3, table 1 at line 8 (of the table), please delete " ((d) (s)) " and insert -- ((d) ^ (s)) --.

In column 3, table 1 at line 11 (of the table), please delete " (d) ~(s)) " and insert -- ((s) ~ ∨(p) --

In column 3, at line 47, please delete " = EXCLUSIVE " and insert -- ^ = EXCLUSIVE --.

Signed and Sealed this

Sixth Day of May, 1997

Attest:

BRUCE LEHMAN

*Attesting Officer*    Commissioner of Patents and Trademarks